C. E. COE.
AUTOMATIC MACHINE FOR CUTTING AND FORMING BELT FASTENERS.
APPLICATION FILED FEB. 20, 1911.
1,037,867.
Patented Sept. 10, 1912.
3 SHEETS—SHEET 1.
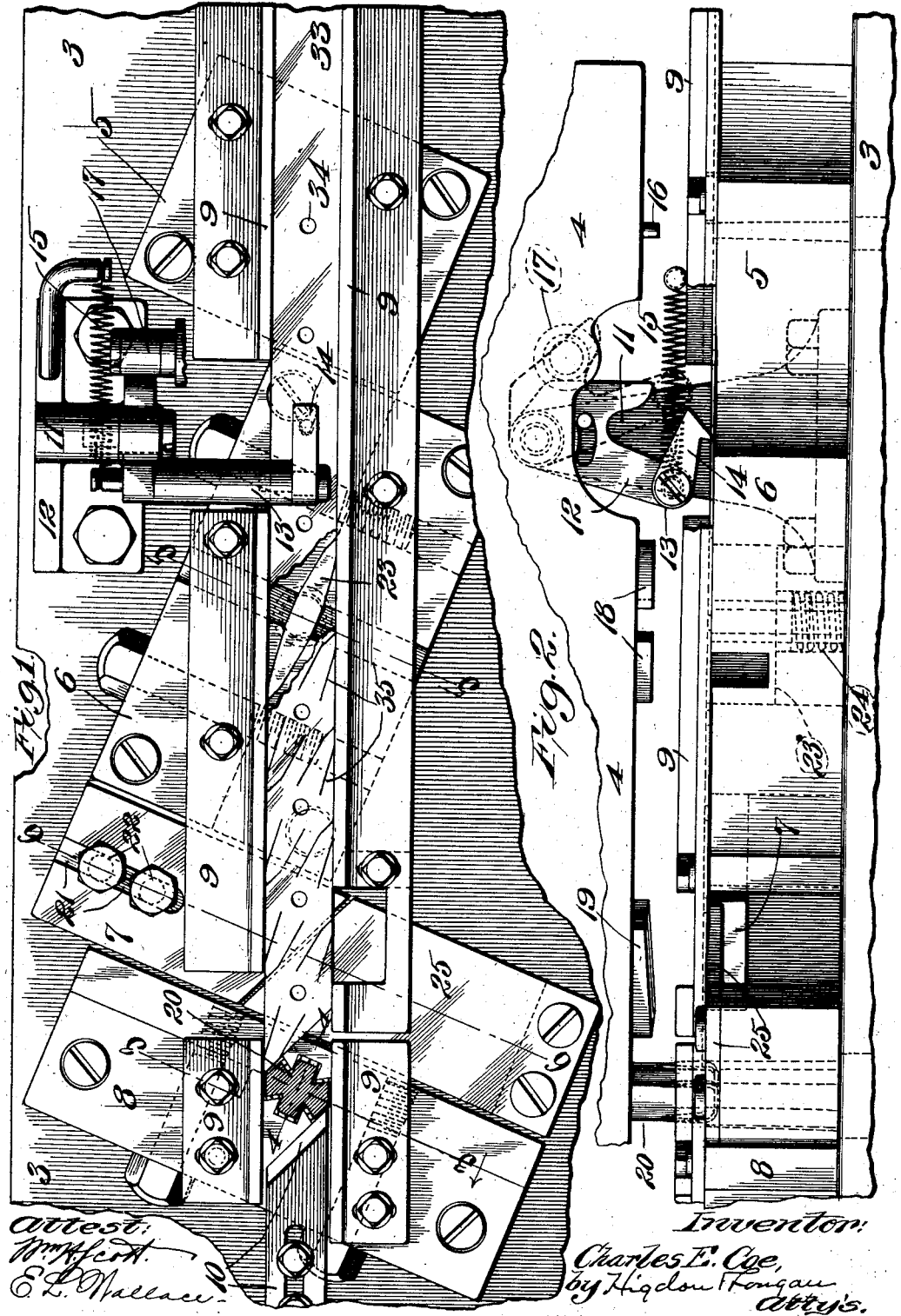

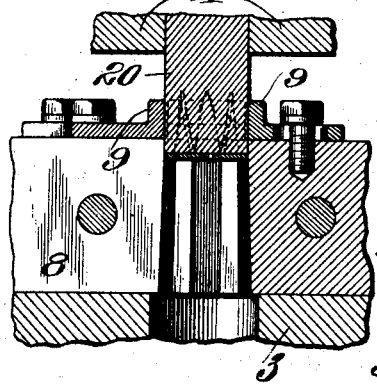
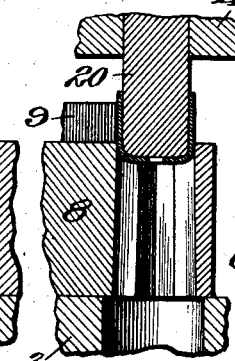
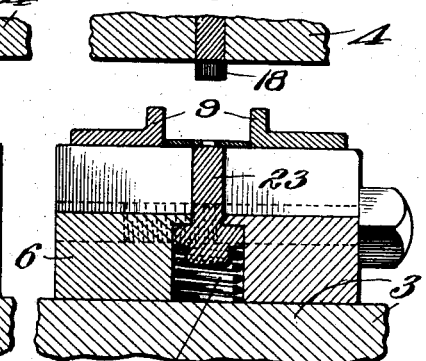
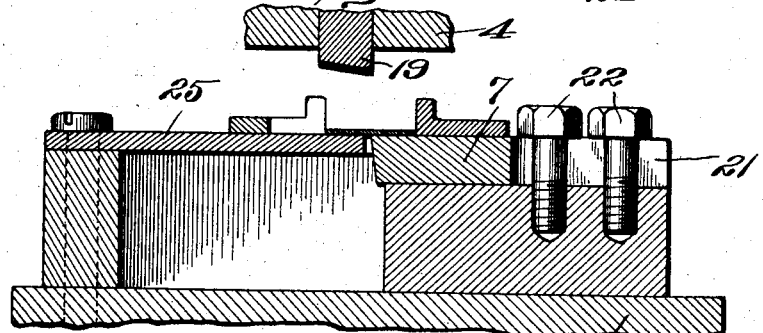
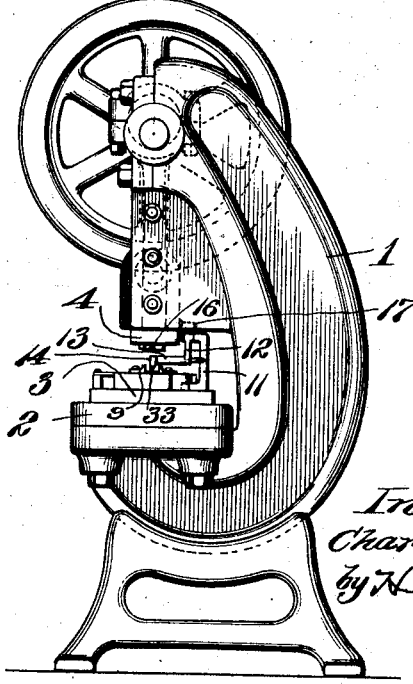

C. E. COE.
AUTOMATIC MACHINE FOR CUTTING AND FORMING BELT FASTENERS.
APPLICATION FILED FEB. 20, 1911.

1,037,867.
Patented Sept. 10, 1912.
3 SHEETS—SHEET 3.

Attest:
Wm. H. Scott.
E. L. Wallace.

Inventor:
Charles E. Coe,
by Higdon & Longan
Attys.

UNITED STATES PATENT OFFICE.

CHARLES E. COE, OF ST. LOUIS, MISSOURI, ASSIGNOR TO WILLIAM F. MORRISON, OF ST. LOUIS, MISSOURI.

AUTOMATIC MACHINE FOR CUTTING AND FORMING BELT-FASTENERS.

1,037,867. Specification of Letters Patent. Patented Sept. 10, 1912.

Application filed February 20, 1911. Serial No. 609,663.

*To all whom it may concern:*

Be it known that I, CHARLES E. COE, a citizen of the United States, and resident of St. Louis, Missouri, have invented certain new and useful Improvements in Automatic Machines for Cutting and Forming Belt-Fasteners, of which the following is a specification containing a full, clear, and exact description, reference being had to the accompanying drawings, forming a part hereof.

My invention relates to improvements in automatic machines for cutting and forming belt fasteners, and is especially directed to improvements in machinery for forming the belt fasteners from a continuous strip of flat wire in which the blanks, forming the belt fasteners, have a trend lengthwise of the strip from which they are formed.

The object of my invention is to construct a machine especially designed for economically manufacturing belt fasteners from a continuous piece of flat metal and in which all of the material of the strip enters into the physical structure of the belt fastener.

In an application for United States Letters Patent filed herewith and serially numbered 609,664, I describe and claim the belt fastener, *per se.*

With the above purposes in view, my invention consists in certain novel features of construction and arrangement of parts as will be hereinafter described, pointed out in the claims and illustrated by the accompanying drawings, in which—

Figure 10:
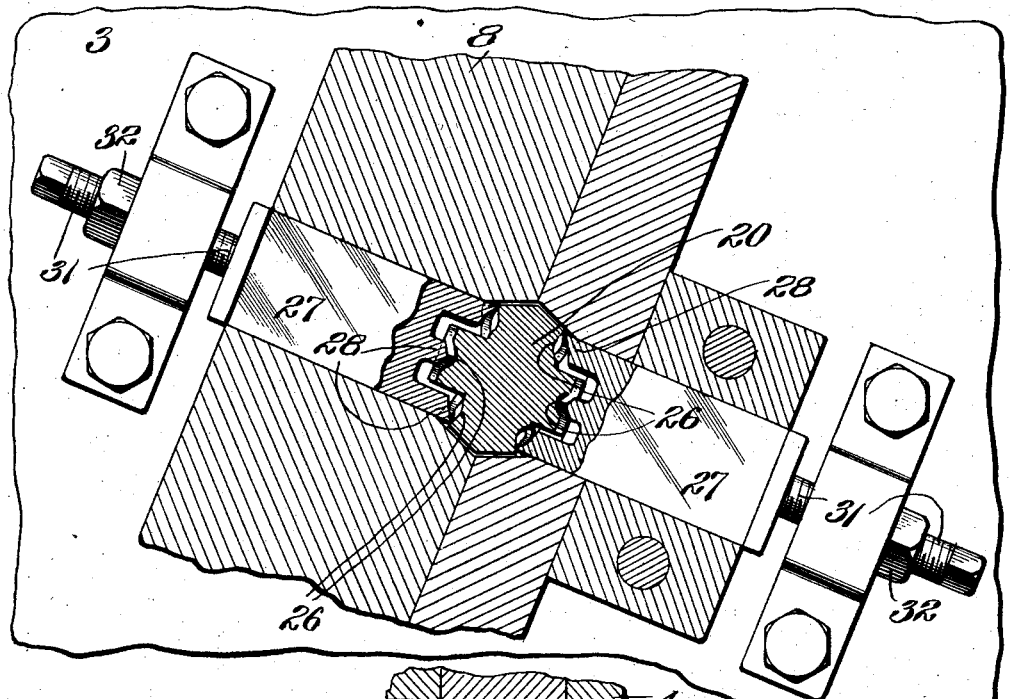
Figure 11:
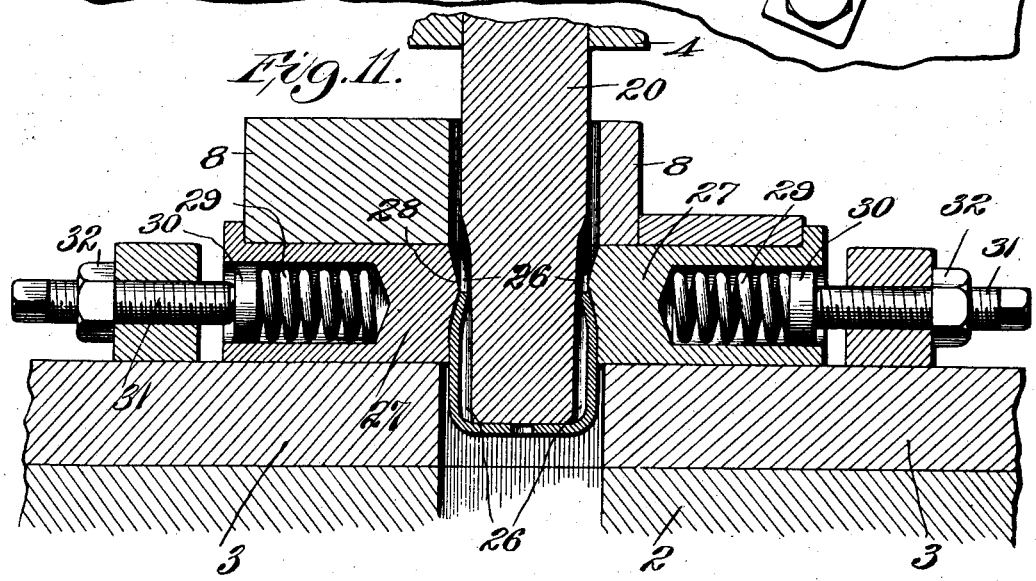

Figure 1 is a fragmental view of a portion of the base plate of my improved machine and illustrates the relative arrangement of the female dies, the male forming die being shown in section; Fig. 2 is a fragmental elevation of the parts shown in Fig. 1, and illustrates the relative positions of all of the male dies; Fig. 3 is a detail, sectional elevation, taken on the line 3—3 of Fig. 1, through the forming dies; Fig. 4 is a sectional elevation taken on the line 4—4 of Fig. 1; Fig. 5 is a sectional elevation taken on the line 5—5 of Fig. 1 and illustrates the cutting dies for making the incisions which define the tines of the fasteners; Fig. 6 is a sectional elevation taken on the line 6—6 of Fig. 1 and illustrates the knives which sever the strip into sections from which individual belt fasteners are formed; Fig. 7 is an end elevation of the complete machine; Fig. 8 is a perspective illustrating a severed blank cut from continuous strip and in its condition just prior to forming the tines or teeth; Fig. 9 is an inverted perspective of the complete belt fastener; Fig. 10 is a plan, partly in section, of a means employed in connection with the forming dies for curving the pointed ends of the teeth of the belt fastener; and Fig. 11 is a sectional elevation illustrating a means for giving to the pointed ends of the teeth a final curvature.

Referring by numerals to the accompanying drawings: 1 designates the frame, 2 the base plate, 3 the female die holder, 4 the die head, for the male punches or dies, which is arranged for vertical movement in the frame 1, and all of the parts just described may be of ordinary construction.

Located upon the base plate 2 and in the sequence following is the female punch die 5, the female shear die 6, the female cutting die 7 and the female forming die 8. Arranged over this series of female dies and preferably secured in place to said dies are the guides 9 and located in proximity to the operating part of the female forming die 8 is an adjustable stop 10. Secured to the base plate 2 and standing upwardly therefrom is a bracket 11 upon which is pivotally mounted a bell crank lever 12 and carried by the bell crank lever, preferably formed integral therewith, is a laterally extending arm 13 and carried by the free end of the arm 13 is a pawl 14. Secured to the end of the arm 13 opposed to the end carrying said pawl is a contractile coil spring 15 which is designed for the operation of the bell crank lever and the pawl in one direction.

Secured on the underneath face of the head 4 and in the sequence following is a male punch 16 mounted in direct opposition to the female punch die 5; a roller 17 which is placed in a position to engage one of the arms of the bell crank lever 12; the spaced-apart, converging shear dies 18, which are arranged opposite the female shear die 6; the cutting blade 19 arranged in opposition to the female cutting die 7 and the male forming die 20.

A number of the female dies, and most particularly the forming die 8 and the die 6, are of the separable variety so that as their working faces are enlarged by wear the major portions of the dies may be dressed.

The female cutting die 7 is provided with a slot 21 so that it may be adjusted as required by its wear in use, and is held to its support by means of the cap screws 22.

Located beneath the female shear die 6 is a yielding stripper 23 normally held to its upward limit of movement by an extensile coil spring 24. Located adjacent the female cutting die 7 and normally standing in a plane parallel with the upper face of the die 7 is a yielding stripper 25, the functions of which strippers will be made more clear hereinafter.

In Figs. 10 and 11, I illustrate a means in connection with the forming device whereby the points of the completed belt fasteners may be bent inwardly toward each other. When this final bend of the points of the teeth is desired the male die is provided with a number of vertically disposed depressions 26, and carried by the female forming die 8 there are diametrically opposed spring-pressed formers 27, the inner faces of which are provided with projecting dies 28, which, by reason of the pressure of the springs 29, act to give the end of each tooth of the belt fastener a slight curvature. Each of the formers 27 is recessed to receive the springs 29 and located in each recess is a follower 30 which is held in position by the threaded rod 31 and which rod together with a nut 32 provides means whereby the tensions of the springs 29 may be varied.

33 designates a flat strip which is supplied to the machine between the guides 9 and from a suitable source, not shown, preferably an ordinary spool.

In the practical operation of the machine, the head 4 is raised and the strip of material is placed in position between the guides 9 and power is then applied to the machine, causing the head 4 to descend, which operation causes a perforation 34 to be made adjacent the end of the strip 33. The head is then elevated and the strip advanced manually so as to be in position to be caught by the pawl 14. A second descent of the head then causes the roller 17 to engage with the bell crank 12 and, by reason of the pawl 14, being in engagement with the perforation 34, the entire strip 33 is advanced a distance equal to the stroke of the bell crank lever. Immediately after the strip has thus been advanced the punch 16 causes a second perforation to be made in the strip. From this condition the operation of the machine is automatic in its entirety. As the head 4 is lowered each stroke there will be a perforation made and the pawl 14 will cause a feeding movement of the strip 33. It might be well to state at this point that it is not absolutely necessary to the proper operation of my machine to cause complete perforations such as 34. I have found it to be, for all practical purposes, necessary only to indent the strip sufficiently so that the pawl may operate in conjunction with a depression or a boss rather than with a complete perforation. After the strip has been sufficiently perforated and advanced as described it is brought to a position to be acted upon by the male and female shear dies 18 and 6, which coact to form shear cuts 35, which incisions extend diagonally of the strip 33 and on each side of one of the perforations 34. The strip thus perforated and cut is advanced with each operation of the head and a substantially diamond-shaped section is severed from the strip, each section corresponding in length to the length of the incisions 35. The sections thus severed are advanced to a position to be acted upon by the forming dies. This advancement of the severed sections is accomplished solely by the engagement therewith of the body of the strip 33, and in order that the severed sections are positioned properly over the forming dies the adjustable stop 10 is provided. After the section has been brought to a position between the forming dies the male die, which is substantially cruciform in cross section, is lowered and carries the blank with it through the female die, which is shaped complementary to the male die.

One of the leading and distinctive features of my machine is the shape of the forming dies which, as previously described, is substantially cruciform in cross section with its arms extended in planes at an angle relative the direction of travel of the strip 33. Another distinctive feature of my improved machine is the construction and positioning of the shearing dies, both for forming the incisions necessary for the formation of the teeth of the belt fasteners and the severing of the sections from the strip. It is to be observed that these cutting members are, like the forming members, arranged at angles paralleling the arms of the forming dies and a still further distinctive feature of my machine is the peculiar shape of the outside faces of two of the arms of the forming dies. These faces of the arms are of such shape as to cause the outermost teeth of the belt fasteners to be formed to stand at angles other than right angles relative a parallel line drawn lengthwise through the belt fastener as required to form teeth whose body portions stand at an angle relative the direction of strain of the belt upon which it is secured, hence the teeth are braced by their angulation and possess strength over the ordinary right angled tooth, which it has been found in practice tends to draw and straighten out when power is applied to the belt.

It is to be observed that the incisions 35 do not extend to the end of one of the sections, hence the central teeth of the belt fastener, at their points, are materially reduced and tapered and that the side teeth are thus formed of lengths considerably shorter than the central teeth and, of course taper uniformly from end to end. It is this reduced point of the central teeth and small ends of the side teeth that are acted upon by the dies 27 to give the ends of the teeth a final curvature, which curvature, when the device is being applied to a belt, naturally tends toward a clenching of the teeth. If they were not otherwise curved there would be a tendency of the teeth to spread in various directions, but inasmuch as they are all given an initial bend inwardly toward each other, the operation of clenching is facilitated.

The angulation of the faces of the forming dies, to create the forming of the body portions of the outside teeth, is preferably such as to cause the body portion of the tooth to be formed so that its outside margins are exactly at right angles relative the plane of the body portion of the device and the inner faces incline somewhat. This shaping of the teeth is particularly valuable for the reason that the straight vertical margins do not tend to crowd the body of the belt outwardly away from the tooth, and all of the body of the belt will be put into position to hold the tooth. The bend of the center tooth to stand at an angle relative the body portion of the fastener is preferably done at a point farther removed from the central portion of the body than the bending line of the outermost teeth, so that all of the teeth will not aline, when applied in a belt.

The office and function of the strippers described is to elevate the strip in a plane above the dies so that in case portions of the body of the strip are deflected, by the operation of one of the elements of the machine, downwardly, the strippers will hold the strip 33 in a position to ride over the dies.

I claim:

1. In a machine of the class described, the combination with guides and means for advancing a strip of metallic material to be operated upon, of means arranged diagonally relative the trend of said guides for forming oppositely extended V-shaped incisions in said material, diagonally disposed means for severing said strip into sections, and means arranged diagonally relative the trend of said guides for shaping the material of said strip bounded by said incisions, substantially as shown.

2. In a machine of the class described, the combination with guides for a strip of material to be operated upon, a pair of perforating dies, automatic means for engagement in perforations formed by said dies for the advancement of the material, oppositely arranged V-shaped cutting dies diagonally disposed relative said guides, diagonally disposed forming dies for shaping the material bounded by the incisions made by said cutting dies, diagonally disposed cutting dies for severing the strip into rhomboidal sections, and spring-pressed formers arranged diagonally of the trend of said guides, for the purposes stated.

In testimony whereof, I have signed my name to this specification, in presence of two subscribing witnesses.

CHARLES E. COE.

Witnesses:
E. L. WALLACE,
N. G. BUTLER.

---

Copies of this patent may be obtained for five cents each, by addressing the "Commissioner of Patents, Washington, D. C."